United States Patent
Lee et al.

(10) Patent No.: US 9,914,219 B2
(45) Date of Patent: Mar. 13, 2018

(54) ROBOT CLEANER AND CONTROLLING METHOD THEREOF

(71) Applicant: Samsung Electronics Co., Ltd., Suwon-si (KR)

(72) Inventors: Ju-sang Lee, Suwon-si (KR); Hong-jun Kim, Yongin-si (KR); Chin-woo Kang, Seoul (KR); Suk-hoon Song, Seoul (KR); Hee-suk Yoon, Seoul (KR); Ki-yong Lee, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 40 days.

(21) Appl. No.: 15/005,481

(22) Filed: Jan. 25, 2016

(65) Prior Publication Data

US 2016/0214260 A1 Jul. 28, 2016

(30) Foreign Application Priority Data

Jan. 23, 2015 (KR) .......................... 10-2015-0011305

(51) Int. Cl.
*B25J 9/16* (2006.01)
*G05D 1/02* (2006.01)
(Continued)

(52) U.S. Cl.
CPC ........... *B25J 9/1679* (2013.01); *B25J 9/0003* (2013.01); *B25J 11/0085* (2013.01);
(Continued)

(58) Field of Classification Search
CPC .... B25J 9/1679; B25J 9/0003; B25J 11/0085; G05D 1/0227; G05D 2201/0203; A47L 2201/04; Y10S 901/46; Y10S 901/01
(Continued)

(56) References Cited

U.S. PATENT DOCUMENTS 6,142,252 A * 11/2000 Kinto ...................... G01S 17/89
180/204
7,288,912 B2 * 10/2007 Landry ................. A47L 9/2805
15/319
(Continued)

FOREIGN PATENT DOCUMENTS

CN 101278820 10/2012
EP 2325714 A2 5/2011
(Continued)

OTHER PUBLICATIONS

Extended European Search Report for Applicatio No. 16152153.9 dated Jun. 20, 2016.
(Continued)

*Primary Examiner* — Jaime Figueroa
(74) *Attorney, Agent, or Firm* — McAndrews, Held & Malloy, Ltd.

(57) ABSTRACT

A robot cleaner based on wall following and a controlling method thereof are provided. The robot cleaner includes a first detector configured to generate a wall detection signal by detecting a wall, a second detector configured to generate a first contact signal through contact with the wall, a cleaner main body in which the first and second detectors are disposed and which includes a driver configured to drive on a surface to be cleaned, and a controller which is mounted on the cleaner main body and to which the first and second detectors and the driver are electrically coupled. The controller controls the driver so that the robot cleaner moving to one direction moves along the wall by the wall detection signal, the robot cleaner rotates to a first direction to be in contact with the wall in response to the first contact signal not being generated within a preset time, and the robot cleaner rotates to a second direction opposite to the first
(Continued)

direction to be spaced from the wall in response to the generated first contact signal.

19 Claims, 19 Drawing Sheets

(51) Int. Cl.
*B25J 9/00* (2006.01)
*B25J 11/00* (2006.01)

(52) U.S. Cl.
CPC ........ *G05D 1/0227* (2013.01); *A47L 2201/04* (2013.01); *G05D 2201/0203* (2013.01); *Y10S 901/01* (2013.01); *Y10S 901/46* (2013.01)

(58) Field of Classification Search
USPC .................................................. 700/245, 253
See application file for complete search history.

(56) References Cited

U.S. PATENT DOCUMENTS

| | | | | |
|---|---|---|---|---|
| 7,761,954 | B2* | 7/2010 | Ziegler | A47L 5/14 15/319 |
| 8,239,992 | B2* | 8/2012 | Schnittman | A47L 11/34 15/319 |
| 8,418,303 | B2* | 4/2013 | Kapoor | A47L 9/106 15/3 |
| 9,615,712 | B2* | 4/2017 | Dooley | A47L 11/284 |
| 9,622,635 | B2* | 4/2017 | Jones | A47L 5/30 |
| 2006/0010638 | A1 | 1/2006 | Shimizu et al. | |
| 2008/0249661 | A1 | 10/2008 | Hong et al. | |
| 2011/0118928 | A1* | 5/2011 | Yoo | A47L 9/2805 701/26 |
| 2011/0226282 | A1 | 9/2011 | Choi et al. | |
| 2012/0065829 | A1* | 3/2012 | Yu | G05D 1/0227 701/23 |
| 2014/0109935 | A1 | 4/2014 | Jang et al. | |
| 2014/0150820 | A1* | 6/2014 | Yoo | A47L 9/009 134/6 |

FOREIGN PATENT DOCUMENTS

| | | |
|---|---|---|
| JP | 2006026028 | 2/2006 |
| JP | 2012125652 | 7/2012 |
| KR | 1020140049751 | 4/2014 |
| KR | 1020140070287 | 6/2014 |

OTHER PUBLICATIONS

"Dynamical Wall Following for a Wheeled Robot Using a Passive Tactile Sensor", IEEE IROS, 2005, pp. 3838-3843, 2005, A.G. Lamperski.

"Pneumatic Sensor: A Complete Coverage Improvement Approach for Robotic Cleaners", IEEE Trans. Instrumentation and Measurement, pp. 1237-1256, 2011, C.-H. Kuo.

Communication pursuant to Article 94(3) EPC dated Feb. 14, 2017 corresponding to EP Application No. EP 16152153.9.

* cited by examiner

ROBOT CLEANER AND CONTROLLING METHOD THEREOF

RELATED APPLICATION(S)

This application claims priority from Korean Patent Application No. 10-2015-0011305, filed on Jan. 23, 2015, in the Korean Intellectual Property Office, the disclosure of which is incorporated herein by reference in its entirety.

BACKGROUND

Apparatuses and methods consistent with exemplary embodiments relate to a robot cleaner which performs cleaning while driving in a section to be cleaned, and more particularly, to a robot cleaner capable of evenly cleaning the entire cleaning area including an area between a wall and the robot cleaner based on wall following and a controlling method thereof.

Robot cleaners may automatically clean an area to be cleaned via suctioning foreign materials such as dust from a floor surface while driving the area to be cleaned without user operation.

The robot cleaners may detect an obstacle (such as a wall) in the area through various sensors and the like and control a driving route and a cleaning operation using the detection result.

The robot cleaners may repeatedly perform a cleaning task while driving according to a predetermined driving pattern. In response to the obstacle or the wall having a certain length or more being present in the cleaning area, the robot cleaners may perform the cleaning task on an interfacing portion between the obstacle or the wall and a floor through the wall following.

For the wall following, the robot cleaners may generally employ a bumper sensor operated in response to a bumper being actuated, depressed or squashed due to a collision with the obstacle, the wall, or a distance sensor.

In response to the bumper signal being detected through the bumper sensor, the robot cleaners using the bumper sensor may drive backward and approach the wall again to perform the wall following. Accordingly, operations of the robot cleaners may be deemed inefficient in terms of time.

In response to the distance sensor being used in the robot cleaner, the robot cleaners may approach the wall to perform the wall following without collision to the wall or obstacle. However, the robot cleaner may not clean a certain area between the wall and obstacle and the robot cleaner due to limitation and error for effectively sensing area of the sensor.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to a robot cleaner capable of cleaning the whole area between a wall and the robot cleaner by performing wall following using the contact sensor through rotation with an angular velocity corresponding to each step according to a contact signal for the step generated from a contact sensor without driving backward even in response to the contact sensor being in contact with the wall or an obstacle, and a controlling method thereof.

According to an aspect of an exemplary embodiment, there is provided a robot cleaner including a first detector configured to generate a wall detection signal by detecting a wall; a second detector configured to generate a first contact signal through contact with the wall; a cleaner main body in which the first and second detectors are disposed and which includes a driver configured to drive on a surface to be cleaned; and a controller which is mounted on the cleaner main body and to which the first and second detectors and the driver are electrically coupled. The controller may control the driver so that the robot cleaner moving to one direction moves along the wall based on the wall detection signal, the robot cleaner rotates to a first direction to be in contact with the wall in response to the first contact signal not being generated within a preset time, and the robot cleaner rotates to a second direction opposite to the first direction to be spaced from the wall in response to the generated first contact signal.

The first detector may include a plurality of distance sensors disposed in a front of the cleaner main body.

The second detector may include a plurality of rotation units elastically hinge-coupled to the cleaner main body and disposed to protrude more than an outer circumference of the cleaner main body; a first sensor configured to generate the first contact signal; and a second sensor configured to generate a second contact signal by detecting the plurality of rotation units rotated toward an inside of the cleaner main body by a preset angle after the first contact signal is generated.

A rotation section of the plurality of rotation units may be from an initial position in which the plurality of rotation units protrude more than the outer circumference of the cleaner main body to a position in which the second contact signal is generated through lead-in of the plurality of rotation units to the inside of the cleaner main body.

Outer surfaces of the plurality of rotation units may curvedly protrude.

The first sensor may be disposed in each of the outer surfaces of the plurality of rotation units.

The first sensor may include at least one tactile sensor.

The first sensor may be disposed in the cleaner main body, and may be established in a position closer to the plurality of rotation units than the second sensor.

The first sensor may be a photo sensor.

The second sensor may be a micro switch configured to generate the second contact signal by being pressed by the plurality of rotation units.

The second sensor may be a photo sensor configured to detect the plurality of rotation units which are led into the inside of the cleaner main body.

An auxiliary brush unit may be rotatably coupled to a bottom of each of the plurality of rotation units.

According to an aspect of an exemplary embodiment, there is provided a method of controlling a robot cleaner, the method including detecting a wall through the robot cleaner moving to one direction; moving the robot cleaner along the wall; turning on a first sensor provided in the robot cleaner by rotating the robot cleaner to a first direction to be in contact with the wall in response to the first sensor being turned on through contact with the wall or the first sensor not being turned on within a preset time; turning off the first sensor by rotating the robot cleaner with a first angular velocity to a second direction opposite to the first direction while the robot cleaner moves; and turning on the first sensor by rotating the robot cleaner to the first direction to be in contact with the wall in response to the first sensor not being turned on within the preset time after the first sensor is turned off.

The method may further include sequentially turning off a second sensor provided in the robot cleaner and the first sensor by rotating the robot cleaner with a second angular velocity greater than the first angular velocity to the second direction in response to the second sensor being turned on in a state that the first sensor is not turned off in the turning off of the first sensor.

The method may further include allowing the robot cleaner to drive backward in response to an on state of the second sensor being maintained beyond a preset time after a second sensor provided in the robot cleaner is turned on in a state that the first sensor is not turned off in the turning off of the first sensor.

The first and second angular velocities may be linearly increased and reduced.

The first and second angular velocities may be increased and reduced according to angular accelerations linearly increased and reduced.

According to an aspect of an exemplary embodiment, there is provided a method of controlling a robot cleaner, the method including detecting a wall through the robot cleaner moving to one direction; moving the robot cleaner along the wall; turning on a first sensor provided in the robot cleaner by rotating the robot cleaner to a first direction to be in contact with the wall in response to the first sensor being turned on through contact with the wall or the first sensor not being turned on within a preset time; turning off the first sensor by rotating the robot cleaner to a second direction opposite to the first direction with a first angular velocity while the robot cleaner moves; and turning on the first sensor by rotating the robot cleaner to the first direction to be in contact with the wall in response to the first sensor not being turned on within the preset time after the first sensor is turned off. The method may further include rotating the robot cleaner to the one direction after a backward driving of the robot cleaner in response to a third sensor or a fourth sensor disposed in one side of the robot cleaner which is not in contact with the wall and configured to detect contact with an obstacle being turned on between the moving of the robot cleaner and the turning off of the first sensor.

The method may further include allowing the robot cleaner to approach the wall again by moving the robot cleaner rotated to the one direction forward.

Additional aspects and advantages of the exemplary embodiments are set forth in the detailed description, and will be obvious from the detailed description, or may be learned by practicing the exemplary embodiments.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1:
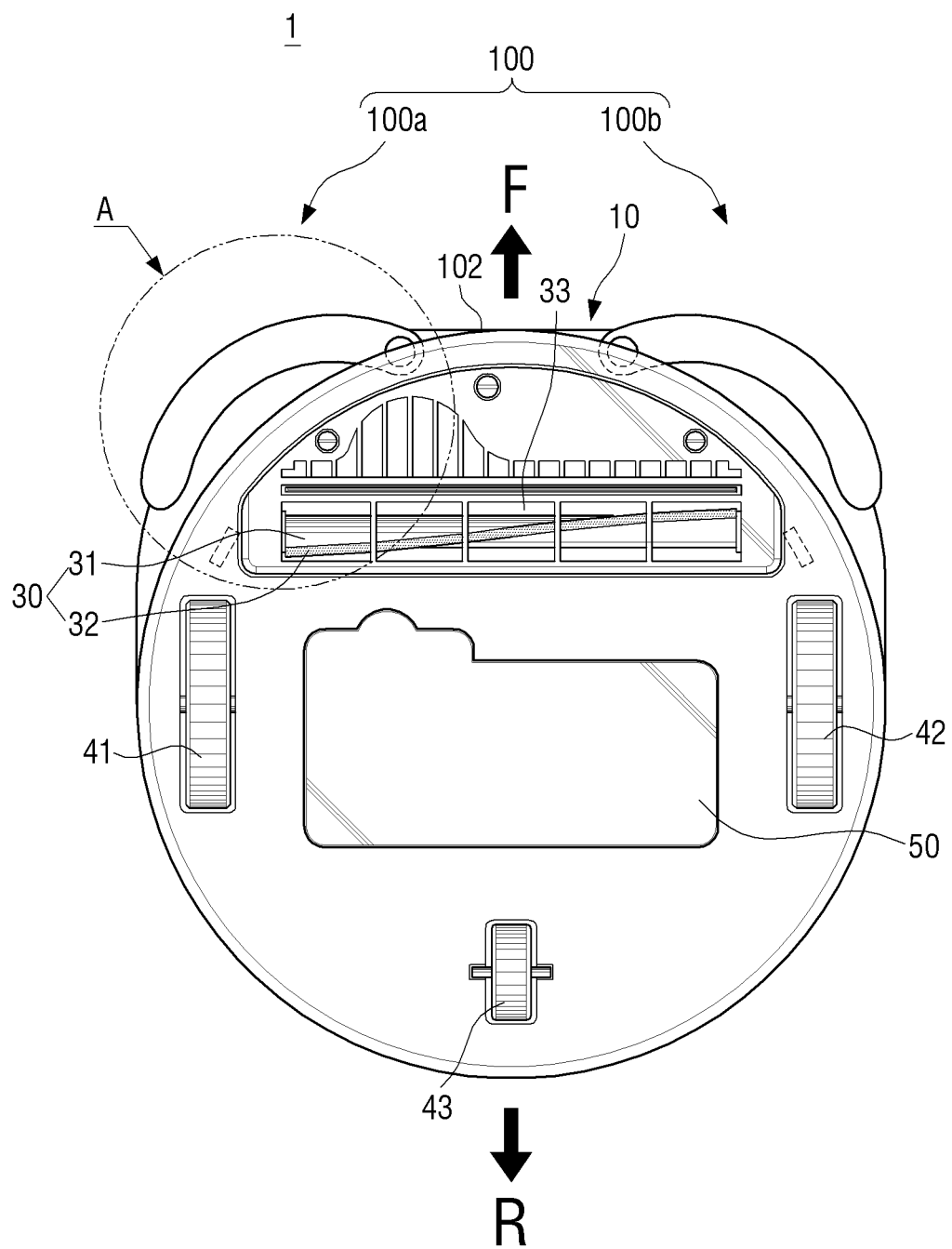
FIG. 1 is a bottom view illustrating a robot cleaner according to an exemplary embodiment.

Hereinafter, the exemplary embodiments are described in greater detail with reference to the accompanying drawings.

Specific exemplary embodiments will be described with reference to accompanying drawings and detailed explanation. However, this does not necessarily limit the scope of the exemplary embodiments to a specific embodiment form. Instead, modifications, equivalents and/or alternatives included in the disclosed concept and technical scope of this specification may be employed.

With regard to the descriptions of drawings, similar reference numerals can be used for similar elements. In addition, the terms such as "first" and "second" used in the description can modify various elements regardless of an order and/or a level of importance, and these terms may be used for the purpose of distinguishing one element from another element, not for limiting the elements. For example, "the first sensor," and "the second sensor" can indicate different parts regardless of an order or a level of importance. For example, without departing the scope of the invention, a first element can be termed a second element, and a second element can be termed a first element in a similar manner.

In the following description, unless otherwise described, the same reference numerals are used for the same elements when they are depicted in different drawings. The matters defined in the description, such as detailed construction and elements, are provided to assist in a comprehensive understanding of the exemplary embodiments. Thus, it is understood that the exemplary embodiments can be carried out without those specifically defined matters. Also, functions or elements known in the related art are not described in detail since they would obscure the exemplary embodiments with unnecessary detail.

Figure 2:
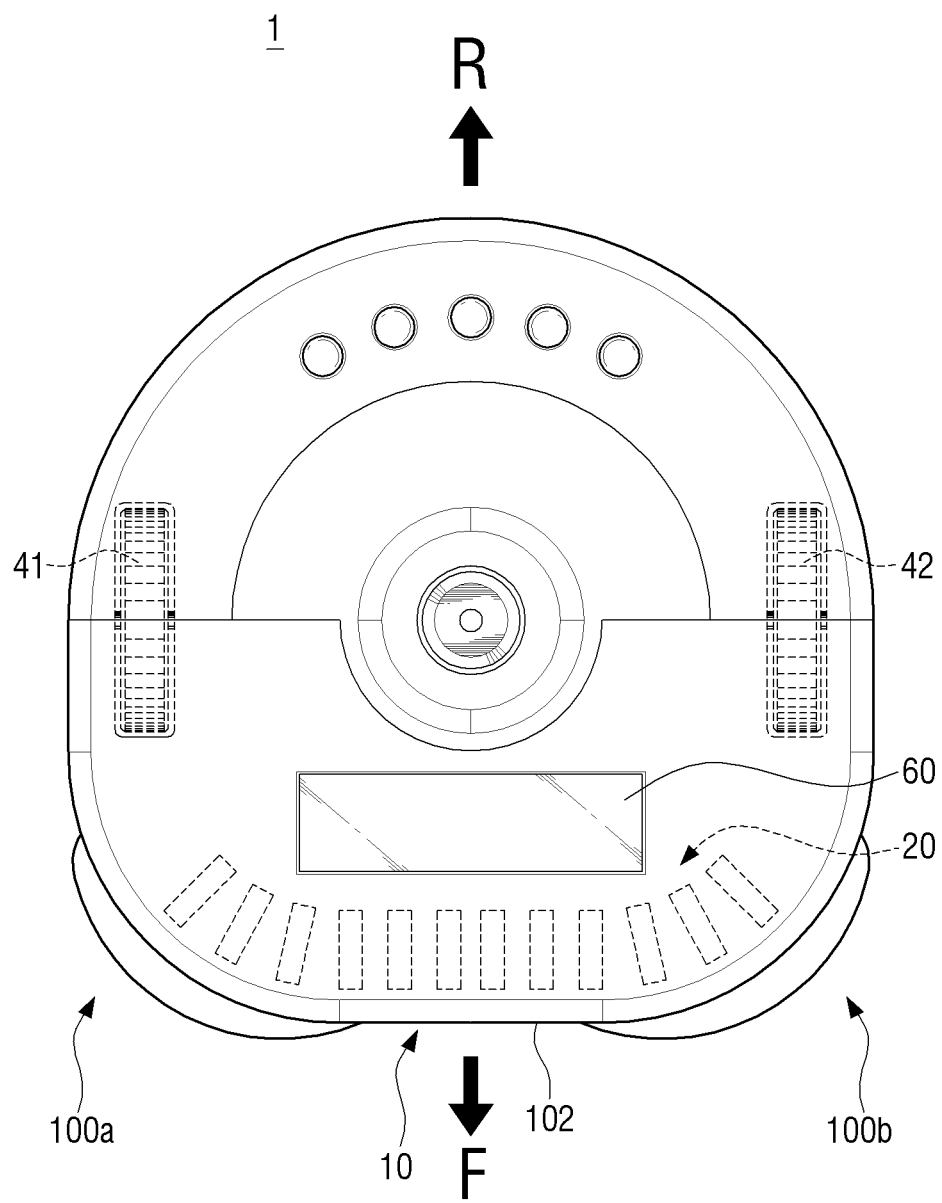
FIG. 2 is a plan view illustrating the robot cleaner illustrated in FIG. 1.
Figure 3:
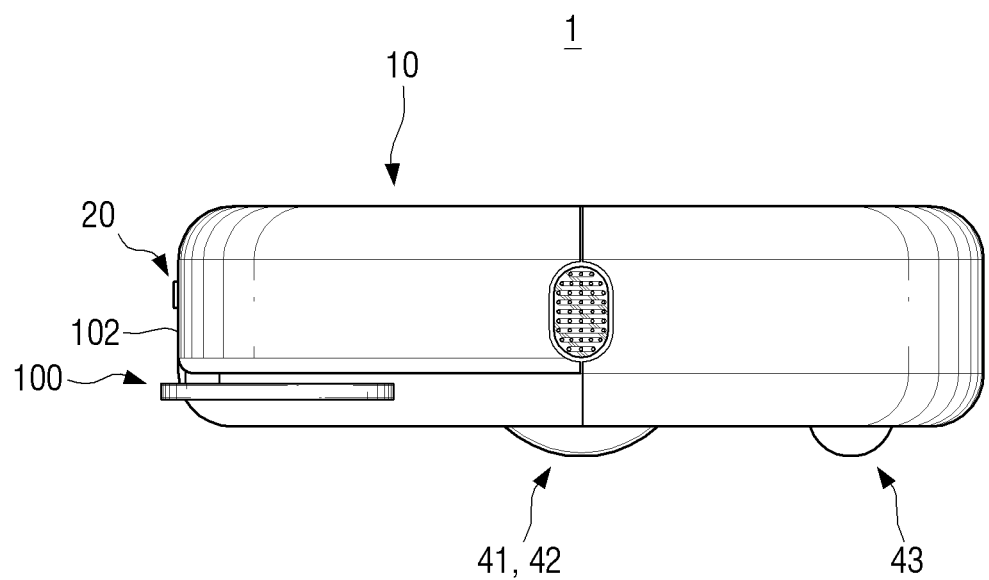
FIG. 3 is a side view illustrating the robot cleaner illustrated in FIG. 1.

FIG. 1 is a bottom view illustrating a robot cleaner 1 according to an exemplary embodiment, FIG. 2 is a plan view illustrating the robot cleaner 1 illustrated in FIG. 1, and FIG. 3 is a side view illustrating the robot cleaner 1 illustrated in FIG. 1.

Referring to FIGS. 1 to 3, the robot cleaner 1 according to an exemplary embodiment may be configured to generate a wall detection signal through a first detector 20, generate first and second contact signals according to a contact with a wall to be followed through a second detector 100, and smoothly follow the wall by controlling the robot cleaner 1 to rotate based on different angular velocities corresponding to the first and second contact signals, thereby efficiently cleaning an area between the wall and the robot cleaner 1.

The robot cleaner 1 according to an exemplary embodiment may include the first detector 20 configured to generate the wall detection signal by detecting the wall, the second detector 100 configured to generate the first and second contact signals through the contact with the wall, a cleaner main body 10 in which the first detector 20 and the second detector 100 are disposed and includes a driver 40 (FIG. 8) configured to move the robot cleaner 1 about a surface or an area to be cleaned, a main brush unit 30 (including a roller 31 and a main brush 32) configured to introduce and sweep dust on the surface to a suction port, and a power unit 50 configured to supply driving power for driving the main body 10 and the driver 40.

The first detector 20 may be disposed in a front 102 of the robot cleaner 1 and include a plurality of distance sensors. The first detector 20 may detect a wall to be followed by the robot cleaner 1 according to a wall following mode. For example, in response to the robot cleaner 1 moving in one direction without a predetermined route, the first detector 20 or the plurality of distance sensors may generate a wall detection signal by detecting a neighboring wall. The robot cleaner 1 may move along the wall according to the wall detection signal generated. The first detector 20 may be implemented with various types including a proximity sensor or a vision sensor other than the distance sensors, but the first detector 20 is not limited thereto.

The second detector 100 may be elastically hinge-coupled to the cleaner main body 10, and may be disposed to protrude from an outer circumference of the main body 10 of the robot cleaner 1.

The second detector 100 having the configuration may generate the first and second contact signals through the contact with the wall followed by the robot cleaner 1. The second detector 100 may be configured to include one of a tactile sensor, a photo sensor, and a micro switch, but the second detector 100 is not limited thereto.

The second detector 100 may be disposed in such a manner that an auxiliary brush unit 140 (of FIG. 5A and FIG. 5B) is rotatable. The second detector 100 will be described later with reference to FIGS. 4A to 5B.

The cleaner main body 10 may form an outer appearance of the robot cleaner 1 and various parts configured to operate the robot cleaner 1 may be disposed in the cleaner main body 10.

The main brush unit 30 may be mounted on an opening (not shown) formed in a portion of a bottom of the main body 10 biased to an upper part F from a central region of the bottom. The main brush unit 30 may clean foreign materials such as dust accumulated on a floor on which the main body 10 is laid.

The opening in the bottom of the main body 10 in which the main brush unit 30 is installed may be a dust inlet 33. The main brush unit 30 may be configured of a roller 31 and a main brush 32 protruding from an outer surface of the roller 31.

The main brush 32 may introduce the dust into the dust inlet 33 by whisking the dust accumulated on the floor through rotation of the motor. The roller 31 may be formed of a rigid material, but the material for the roller 31 is not limited thereto.

The main brush 32 may be formed of various materials having elasticity. Although not shown in drawings, a blower configured to generate suction force may be provided in the dust inlet 33, and may allow the dust flowing from the dust inlet 33 to a dust collector (not shown).

Figure 8:
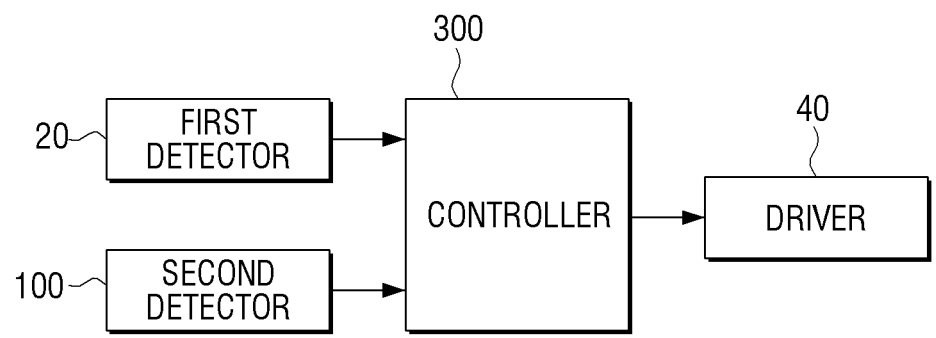
FIG. 8 is a diagram illustrating a control block of a robot cleaner according to an exemplary embodiment.

The power unit 50 may include a battery electrically coupled to driving devices configured to drive the main body 10 and various parts mounted on the main body 10 and configured to supply the driving power to the driver 40 (of FIG. 8). The battery may include a rechargeable secondary battery, and may be recharged by receiving power from a docking station (not shown) in response to the main body 10 being coupled to the docking station after a cleaning process.

The driver 40 may include driving wheels 41 and 42 and a caster 43.

Two driving wheels 41 and 42 may be symmetrically disposed in left and right edges of the bottom of the main body 10 based on the central region. The driving wheels 41 and 42 may be configured to perform a moving operation such as forward driving, backward driving, and rotation driving in the cleaning process.

The caster 43 may be disposed in a front edge or a rear edge of the bottom of the main body 10 based on a driving direction. A rotation angle of the caster 43 may be changed according to a state of the floor on which the robot cleaner 1 is moving in such a manner that the main body 10 may be kept in a stable posture. The driving wheels 41 and 42 and the caster 43 may be configured in one assembly, and may be detachably mounted on the main body 10.

A display 60 may be disposed in a top of the robot cleaner 1, and display various states of the robot cleaner 1. For example, the display 60 may display a battery charge state, a full state of dust in a dust collector (not shown), a cleaning mode, a wall following mode, and a sleep mode of the robot cleaner 1, and the like.

Although not shown in drawings, the robot cleaner 1 according to an exemplary embodiment may include an input unit, and may receive, for example, a command for the cleaning mode, the wall following mode, the sleep mode, power on/off, and the like from the user through the input unit.

Figure 4A:
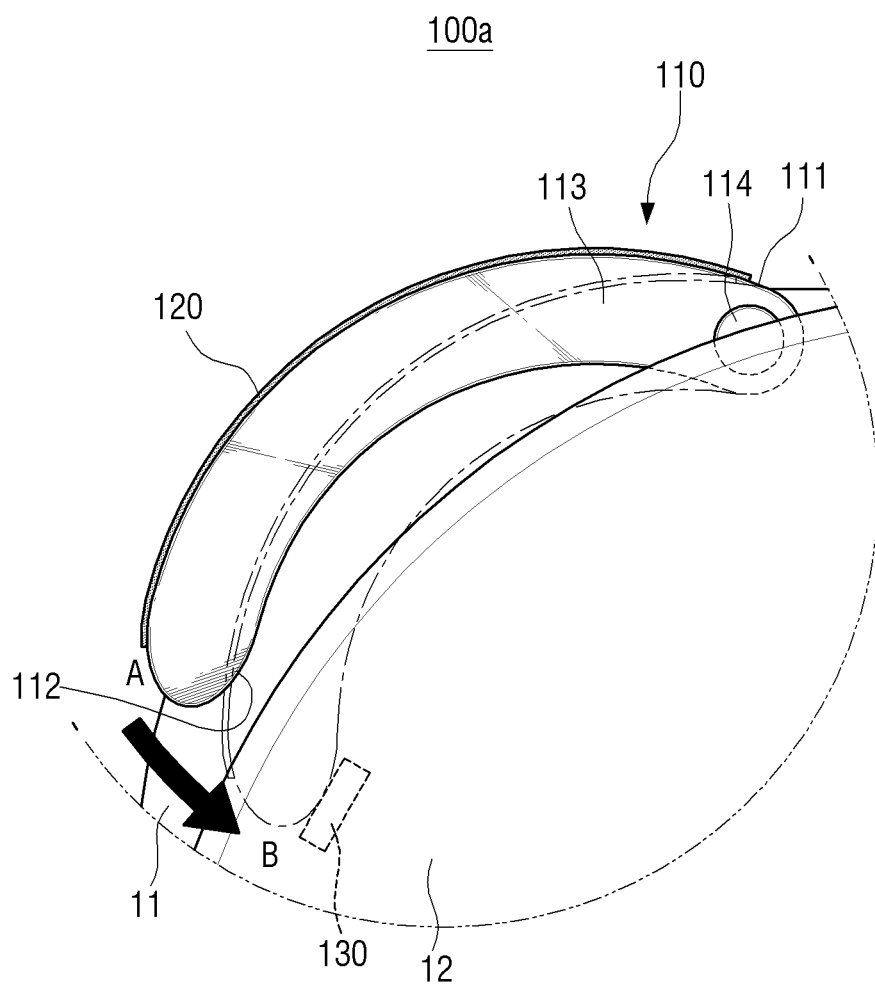
FIGS. 4A and 4B are enlarged bottom views illustrating a portion A of the robot cleaner illustrated in FIG. 1.
Figure 4B:
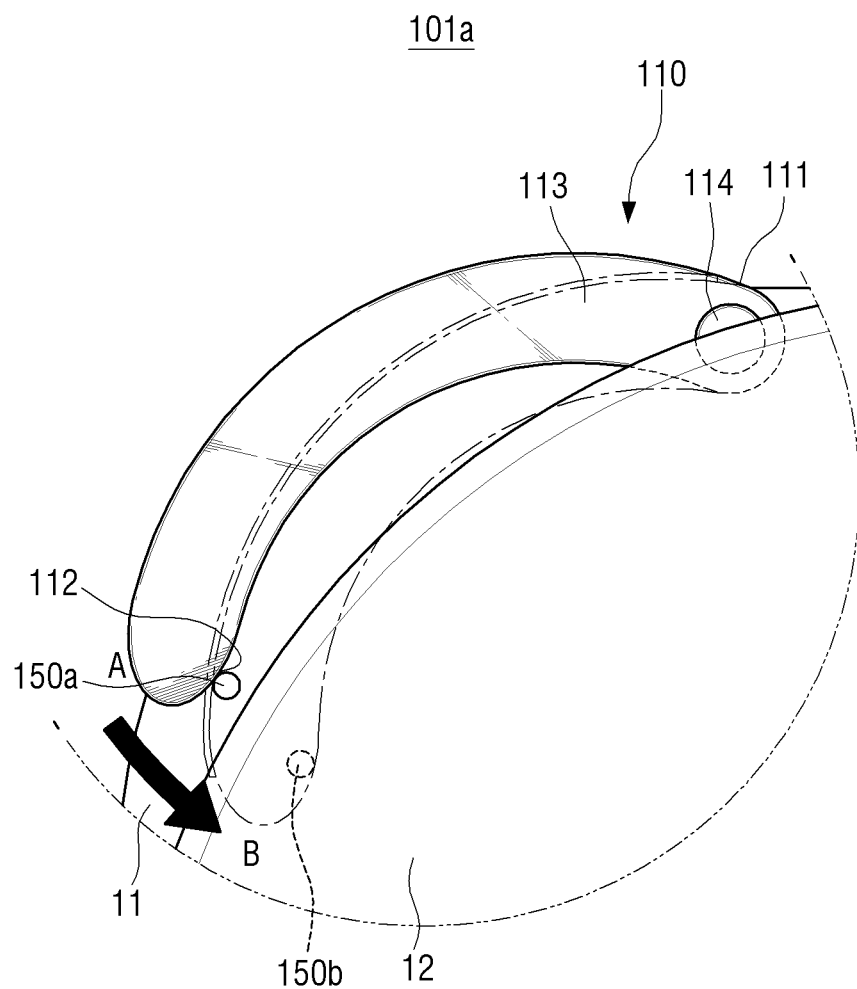

FIGS. 4A and 4B are enlarged views illustrating a portion A of the robot cleaner 1 illustrated in FIG. 1.

Referring to FIGS. 4A and 4B, the second detector 100 according to an exemplary embodiment may include the second detector 100a and 101a. The second detector 100a and 101a may include, for example, rotation units 110, first sensors, and second sensors.

The rotation unit 110 may be elastically hinge-coupled to an inner side of the main body 10 of the robot cleaner 1 and at least of which may protrude from the outer circumference of the robot cleaner 1.

For example, the rotation unit 110 may protrude from the front 102 of the robot cleaner 1, and may be supported to an outward direction of the robot cleaner 1 by an elastic member (not shown) disposed in the inside of the main body 10.

The rotation unit 110 may make contact with a wall earlier than the main body 10 at the moment when the robot cleaner 1 makes contact with the wall. The rotation unit 110 may be reciprocally rotated based on a hinge connector 114 from an initial position (A position) in which the rotation unit 110 protrudes more from the outer circumference of the cleaner main body 10 to a maximum lead-in position (B position) to an interior of the cleaner main body 10.

The outer surface of the rotation unit 110 may extend to curvedly protrude, for example, along an outer circumference of a side from the front of the robot cleaner 1. The hinge connector 114 of the rotation unit 110 may be disposed in the front of the robot cleaner, but this is not limited thereto. The hinge connector 114 may be disposed in the one side of the robot cleaner 1. Even in response to an angle between the wall and the moving direction of the robot cleaner 1 being extremely small, the rotation unit 110 may make contact with the wall earlier than the cleaner main body 10.

In response to the robot cleaner 1 continuously pressing against the wall, the rotation unit 110 may be pressed toward the interior of the robot cleaner 1, between a top plate 11 and a bottom plate 12 of the robot cleaner 1. In response to the robot cleaner 1 no longer making contact with the wall, the rotation unit 110 may spring back from the interior of the robot cleaner 1 to protrude along the outer circumference of the robot cleaner 1 by an elastic member (not shown) again.

For example, the second detector 100a may be configured to include a tactile sensor 120 disposed in the outer surface 111 of the rotation unit 110 among the first sensor.

For example, the first sensor in the form of a tactile sensor 120 may be disposed to surround the outer surface 111 of the rotation unit 110. In this way, the first sensor (the tactile sensor 120) may generate the first contact signal through making contact with the wall in response to the robot cleaner 1 moving to the wall. As the tactile sensor is disposed to surround the outer surface 111 of the rotation unit 110, the tactile sensor may generate the first contact signal in response to any point along the rotation unit 110 making contact with the wall.

In another example, the second detector 101a may be configured to include the first sensor in the form of a photo sensor 150a. In this example, the photo sensor 150a may further include a light emitter (e.g., light emitter 151 of FIG. 7) and a light receiver (e.g., light receiver 152 of FIG. 7). The photo sensor 150a may be operated by detecting a variation of light emitted from the light emitter 151, irradiated to and reflected from an object, and then reached to the light receiver 152 or position change in light-receiving positions (see P1 and P2 of FIG. 7). For example, the photo sensor 150a may be disposed in the cleaner main body 10. In another example, the photo sensor 150a may be disposed in a surface of the rotation unit 110. The detailed configuration and operation of the photo sensor 150a, 150b will be described later with reference to FIG. 7.

The exemplary embodiment has described that the first sensor may include the tactile sensor 120 and the photo sensor 150a, but the first sensor are not limited thereto.

For example, the second detector 100a may be configured to include a second sensor in the form of a micro switch 130 disposed in the interior of the robot cleaner 1.

In this example, the micro switch 130 constituting the second sensor may generate the second contact signal by being pressed by an inner surface 112 of the rotation unit 110 led into the inside of the robot cleaner 1.

In another example, the second detectors 101a may be configured to include a photo sensor 150b disposed in the interior of the robot cleaner 1 among the second sensor. The configuration and operation of the photo sensor 150b are similar to those of the photo sensor 150a constituting the first sensors, and thus detailed description thereof will be omitted.

The exemplary embodiment has described that the second sensor may include the micro switch 130 and the photo sensor 150b, respectively, but the second sensors are not limited thereto.

In the meantime, with respect to a pair of the second detector as illustrated in FIG. 1, the first and second sensors may be selectively applied. In other words, the selectively applying means that, as for the second detector (100a) of the part A, the first sensor may be applied as a tactile sensor 120 as illustrated in FIG. 4A, the second sensor may be applied as a micro switch 130, and as for the second detector (100b) in an opposite side of the part A, both the first and second sensors may be applied as an optical sensor 150a and 150b as illustrated in FIG. 4B.

Figure 5A:
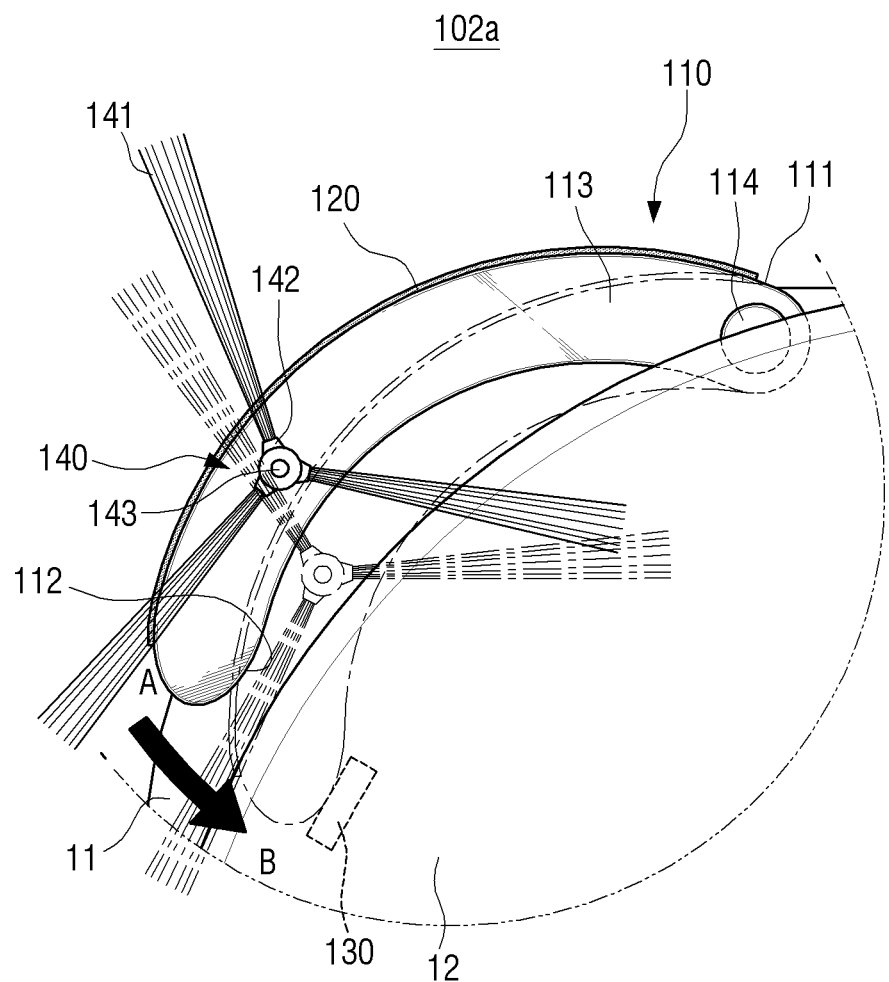
FIGS. 5A and 5B are enlarged bottom views illustrating a portion A of the robot cleaner illustrated in FIG. 1 according to another exemplary embodiment.
Figure 5B:
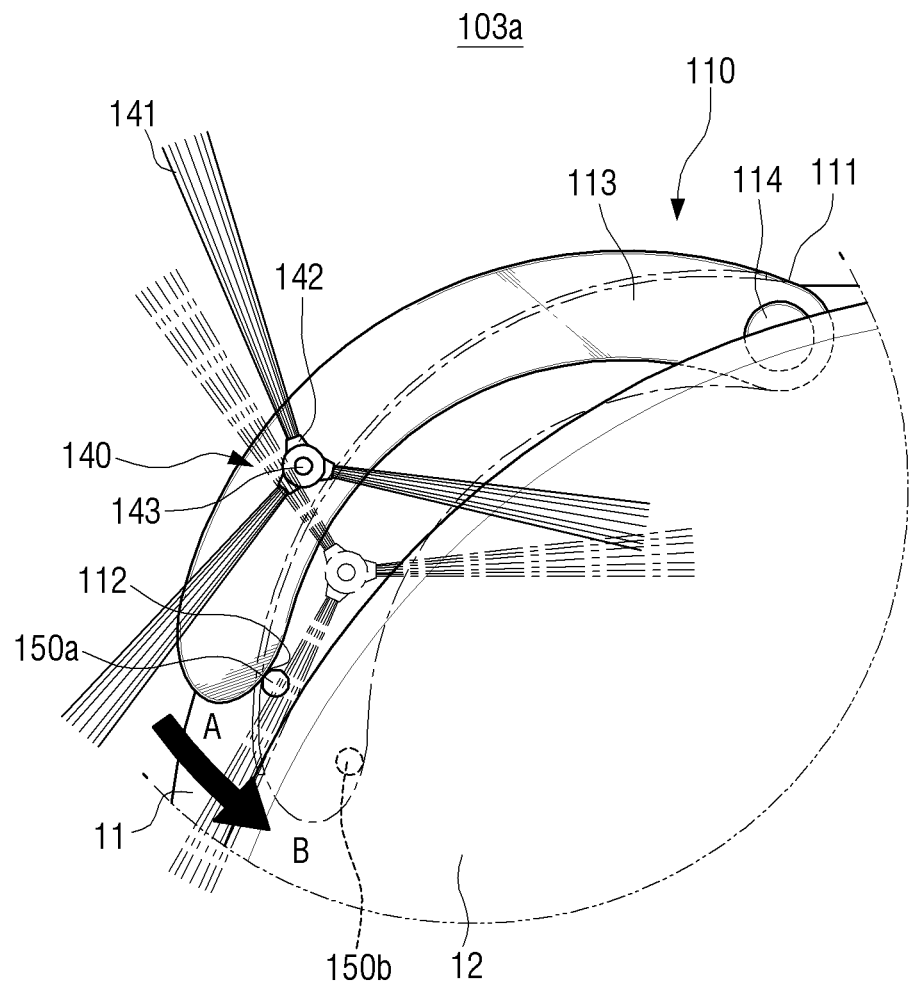

FIGS. 5A and 5B are enlarged views illustrating a portion A of the robot cleaner 1 illustrated in FIG. 1 according to another exemplary embodiment.

Referring to FIGS. 5A and 5B, the second detector 100 according to another exemplary embodiment may include second detectors 102a and 103a. The second detector 102a and 103a according to another exemplary embodiment may include rotation units 110, the first sensor, the second sensor, and auxiliary brush units 140. The second detector 102a and 103a are different from the second detector 100a and 101a according to an exemplary embodiment in that the second detector 102a and 103a further includes the auxiliary brush units 140.

Hereinafter, description for the configuration of the second detector 102a and 103a overlapping the configuration of the second detector 100a and 101a according to an exemplary embodiment will be omitted.

The second detector 102a and 103a according to another exemplary embodiment may include the rotation units 110 of which the auxiliary brush units 140 are installed in a bottom 113 thereof. The exemplary embodiment has described that the auxiliary brush unit 140 is installed in the bottom 113 of the rotation unit 110, but this is not limited thereto.

In the second detector 102a and 103a having the configuration according to another exemplary embodiment, while the robot cleaner 1 follows the wall, the auxiliary brush unit 140 installed in the bottom 113 of the rotation unit 110 may introduce dust into the dust inlet 33 by whisking the dust accumulated on the floor. Accordingly, the cleaning efficiency may be improved by introducing the dust accumulated in the area between the wall and the robot cleaner 1 into the dust inlet 33 while the robot cleaner 1 follows the wall. The auxiliary brush unit 140 installed in the rotation unit 110 will be described in detail with reference to FIG. 6.

Figure 6:
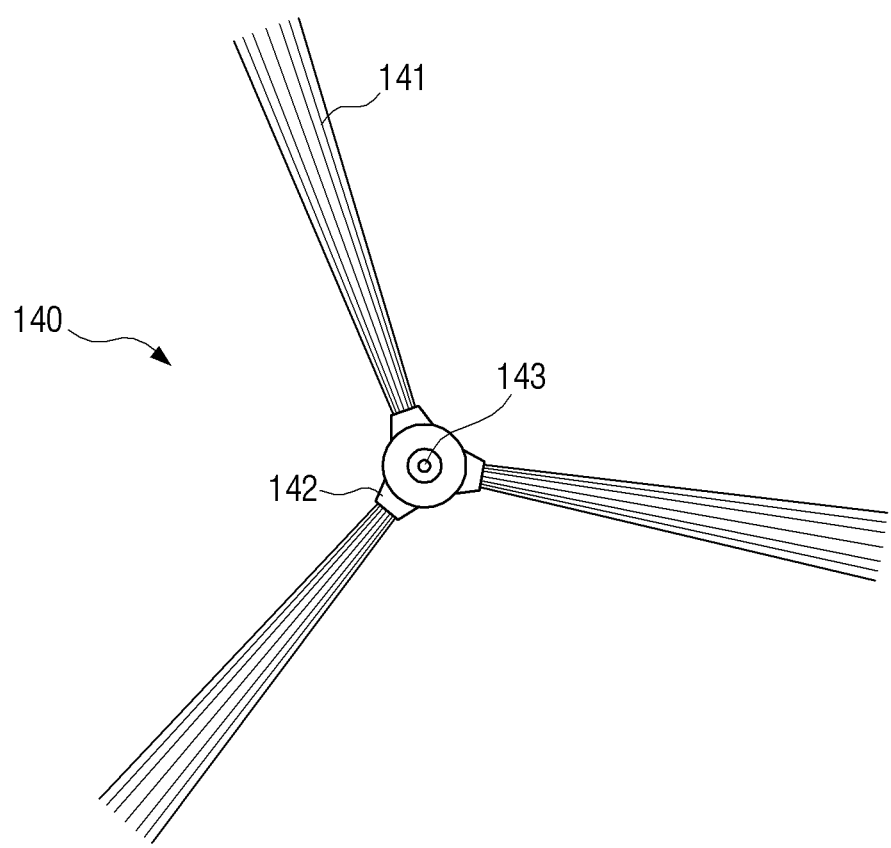
FIG. 6 is a plan view illustrating an auxiliary brush unit illustrated in FIG. 1.

FIG. 6 is a plan view illustrating the auxiliary brush unit 140 illustrated in FIGS. 5A and 5B.

Referring to FIG. 6, the auxiliary brush unit 140 may be disposed in the bottom 113 of the rotation unit 110. A brush arm 142 may be formed to extend to an outer side of a radius direction of the auxiliary brush unit 140. The brush arm 142 may be coupled to a rotation shaft 143 and a brush 141 may be coupled to the brush arm 142.

The brush 141 may be formed of a soft material so that the first sensor may be in smooth contact with the wall to generate the first contact signal.

The rotation shaft 143 may be electrically coupled to a motor (not shown) and may receive rotation force. The auxiliary brush unit 140 which receives the rotation force from the motor (not shown) through the rotation shaft 143 may rotate to sweep and collect dust accumulated in an area adjacent to the wall into a pile, or to further scatter the accumulated dust. Accordingly, the cleaning area may increase and thus the area adjacent to the wall or a corner area of the floor may be also cleaned.

Figure 7:
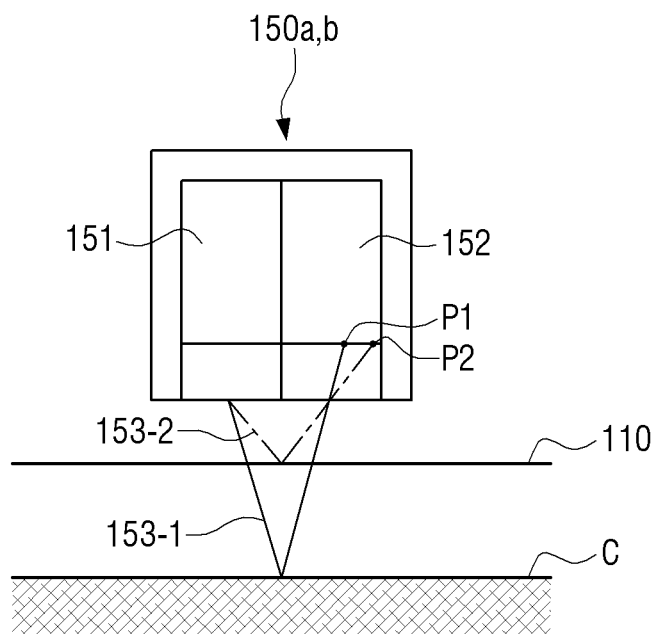
FIG. 7 is a side view illustrating an example of a first sensor and a second sensor in the form of a photo sensor according to an exemplary embodiment.

FIG. 7 is a side view illustrating the photo sensor 150a and 150b as an example of the first and second sensors.

Referring to FIG. 7, the photo sensor 150a, 150b may include the light emitter 151 and the light receiver 152. The photo sensor 150a, 150b having the configuration may be operated by detecting a variation of light emitted from the light emitter 151, irradiated to and reflected from an object, and then reached to the light receiver 152 or position change in the light-receiving positions P1 and P2.

For example, the photo sensor 150a, 150b may be disposed in the cleaner main body 10. In response to the emitted light being irradiated into a floor C to be cleaned, the irradiated emitted light may be reflected from the floor to be cleaned and then incident to the light receiver 152 along a first trajectory 153-1. The emitted light reflected along the first trajectory 153-1 may form an image in a first light receiving portion P1 in the light receiver 152. The rotation unit 110 may be deviated from the first position A through the contact made with the wall, compressed into the interior of the robot cleaner 1, and located on the first trajectory 153-1 of the emitted light. Accordingly, the light emitted from the light emitter 151 of the photo sensor 150a, 150b provided in the cleaner main body 10 may be reflected from the bottom 113 of the rotation unit 110 and incident to the light receiver 152 along a second trajectory 153-2, and the emitted light may form an image in a second light receiving position P2.

In this example, the rotation unit 110 may be located closer to the photo sensor 150a, 150b than the floor surface C to be cleaned, and thus the reflected amount of the emitted light reflected from the bottom 113 of the rotation unit 110 may be greater than the reflected amount of the emitted light reflected from the floor surface C to be cleaned. The photo 150a, 150b sensor may generate the first contact signal by detecting a difference between the reflected amounts. The photo sensor 150a, 150b may generate the first contact signal by detecting position change from the first light receiving position P1 to the second light receiving position P2 of the emitted light which is reflected and incident thereto other than the difference between the reflected amounts.

That is, through the operation, the photo sensor 150a, 150b may generate the first contact signal by detecting the light variation amount of the reflected emitted light or the position change of the light receiving positions P1 and P2.

In response to the first and second sensors being configured of the photo sensor 150a and 150b having such configuration, the first sensor in the form of the photo sensor 150a may be established in a position closer to the rotation unit located in the A position than the second sensor. For example, the first sensor disposed in the cleaner main body 10 may be disposed close to the rotation unit 110 located in the A position so as to detect the rotation unit 110 deviated from the A position. The second sensor may be disposed close to the rotation unit 110 located in the B position spaced from the A position so as to detect the rotation unit 110 approaching the B position.

Hereinafter, the moving and cleaning operation of the robot cleaner having the above-described configuration according to an exemplary embodiment will be described in detail.

It may be assumed that the cleaning is typically performed by the main brush unit while driving of the robot cleaner 1.

FIG. 8 is a diagram illustrating a control block of the robot cleaner 1 according to an exemplary embodiment.

Referring to FIG. 8, the robot cleaner 1 according to an exemplary embodiment may include the first detector 20 configured to detect a neighboring wall including a surrounding environment of the robot cleaner 1, the second detector 100 configured to generate the first and second contact signals in response to the robot cleaner being in contact with the wall, a controller 300 configured to control an operation of the driver 40 according to the first and second contact signals as the detection results of the first detector 20 and the second detector 100, and the driver 40 configured to move the robot cleaner 1.

As described above, the first detector 20 may detect a wall to be followed by the robot cleaner 1 according to the wall following mode. To detect the wall to be followed, the first detector 20 which is disposed in the front of the robot cleaner 1 and configured of a plurality of distance sensors may generate a wall detection signal by detecting a neighboring wall. The first detector 20 may be implemented in various types including a proximity sensor or a vision sensor other than the distance sensor, but the first detector is not limited thereto.

As described above, the second detector 100 may detect the contact of the robot cleaner 1 with the wall. To detect the contact of the robot cleaner 1 with the wall, the second detector 100 may be configured of one of a tactile sensor, a photo sensor, and a micro switch, but the second detector 100 is not limited thereto.

The driver 40 may move the robot cleaner 1 as described above. To move the robot cleaner 1, the driver 40 including the driving wheels 41 and 42 and the caster 43 may perform a forward driving operation and a backward driving operation of the robot cleaner 1 according to a control signal of the controller as well as a rotation operation according to an angular velocity for a step.

The controller 300 may control the driver 40 based on the signals generated from the first detector 20 and the second detector 100.

Figure 9A:
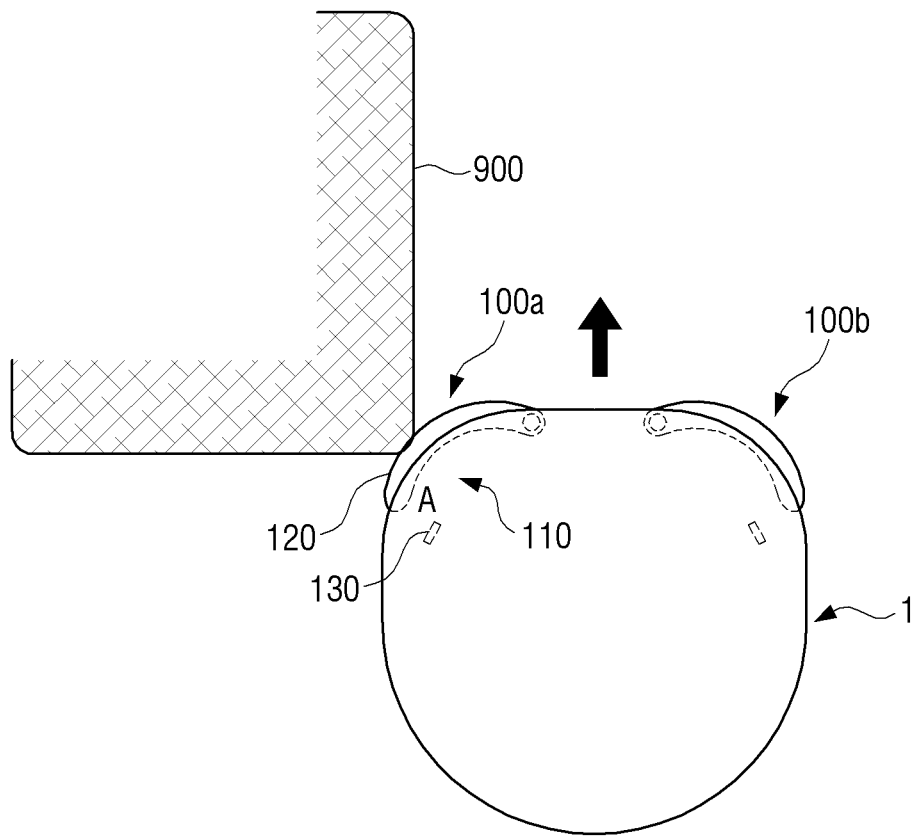
FIGS. 9A and 9B are diagrams illustrating generation of first and second contact signals of a robot cleaner according to an exemplary embodiment.
Figure 9B:
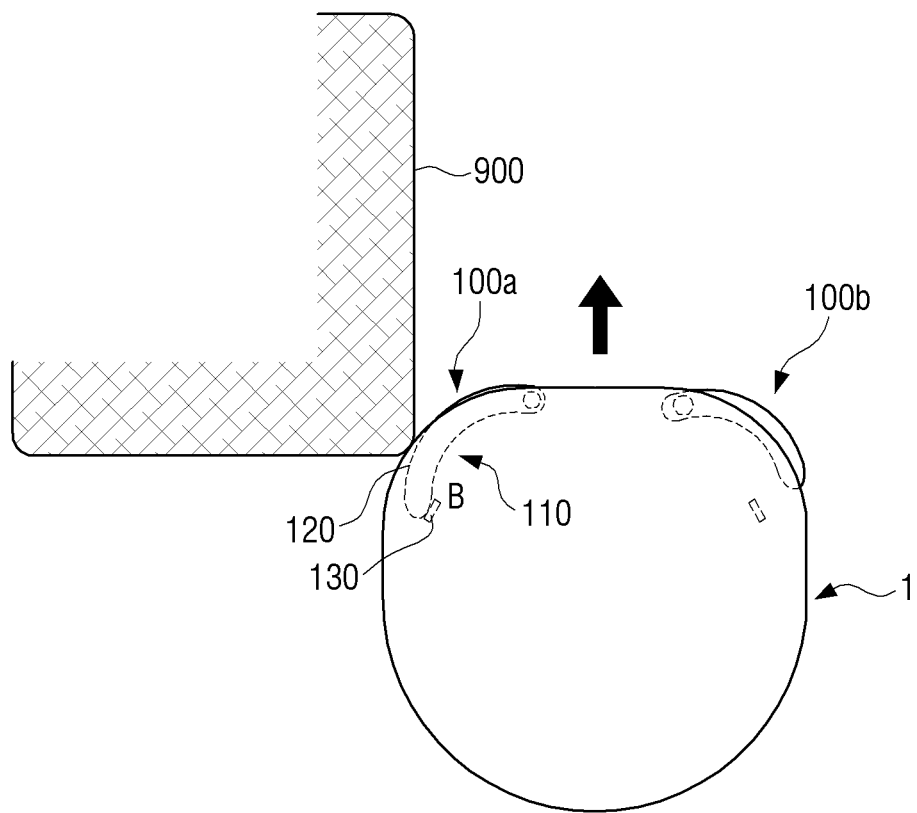

FIGS. 9A and 9B are diagrams explaining generation of the first and second contact signals in the robot cleaner 1 according to an exemplary embodiment.

Referring to FIG. 9A, in response to the robot cleaner 1 according to an exemplary embodiment being in contact with a wall or an obstacle, the first sensor 120 of the second detector 100a disposed in the left preferentially generate the first contact signal by detecting the contact with an obstacle 900. The rotation unit 110 constituting the second detector 100a may be located in the first position A.

Referring to FIG. 9B, as the robot cleaner 1 further moves to a side of the obstacle 900 in a state that the robot cleaner 1 is making contact with the obstacle 900, the rotation unit 110 may move or be depressed to a second position B. Accordingly, the second sensor 130 may generate the second contact signal. The first sensor 120 may continuously generate the first contact signal in an ON state. However, in response to the second contact signal being generated from the second sensor 130, the controller 300 to be described later may control the driver 40 according to the second contact signal in preferential consideration of the second contact signal.

Figure 10:
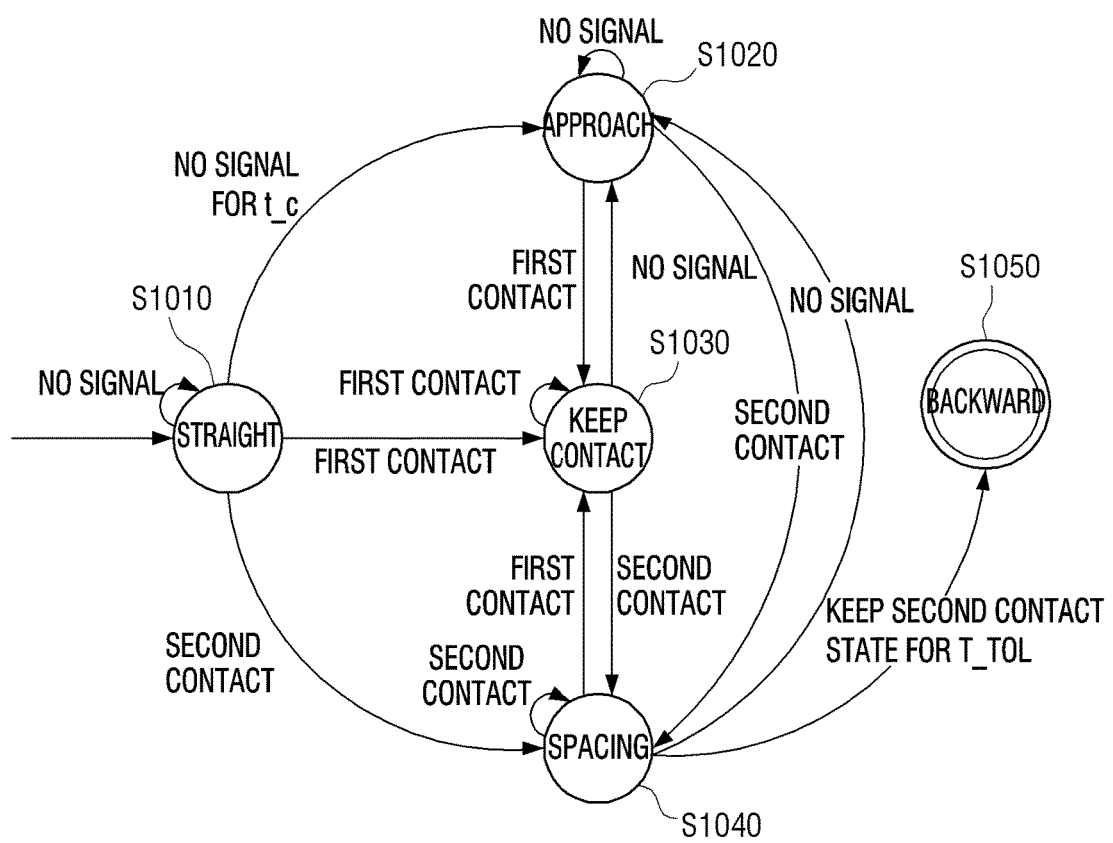
FIG. 10 is a sequence diagram illustrating a wall following process of a robot cleaner according to an exemplary embodiment.

FIG. 10 is a sequence diagram illustrating a wall following process of the robot cleaner 1 according to an exemplary embodiment.

Referring to FIG. 10, the robot cleaner 1 may start the wall following mode and drive straight along a wall in state S1010.

While the robot cleaner 1 drives straight, in response to the first and second contact signals not being generated, the robot cleaner 1 may maintain the straight driving in state S1010.

While the robot cleaner 1 drives straight, in response to the first and second contact signals not being generated within a preset time t_c, the robot cleaner 1 may rotate to a first direction approaching a wall to be followed with a fixed angular velocity and approach the wall in state S1020.

In response to the first contact signal being generated within the preset time while the robot cleaner 1 drives straight, the robot cleaner 1 may rotate to a second direction spaced from the wall with a first angular velocity, and the robot cleaner 1 may maintain a significant small angular velocity so as to maintain the contact with the wall for a predetermined amount of time or a maximum long time in state S1030.

In response to the first and second contact signals being generated within the preset time while the robot cleaner 1 drives straight, the robot cleaner 1 may rotate to the second direction spaced from the wall with a second angular velocity, and the robot cleaner 1 may maintain a significant large angular velocity so as to allow the robot cleaner 1 to be spaced from the wall, for example, as soon as possible, in state S1040.

The robot cleaner 1 may rotate to the first direction approaching the wall to be followed with the fixed angular velocity and approach the wall in state S1020.

While the robot cleaner 1 approaches the wall, in response to the first and second contact signals not being generated, the robot cleaner 1 may continuously maintain the approach operation in state S1020.

In response to the first contact signal being generated while the robot cleaner approaches the wall, the robot cleaner 1 may rotate to the second direction spaced from the wall with the first angular velocity, and the robot cleaner 1 may maintain a significant small angular velocity so as to maintain the contact with the wall in state S1030, for example, for a maximum long time.

In response to the first and second contact signals being generated within the preset time while the robot cleaner 1 approaches the wall, the robot cleaner 1 may rotate to the second direction spaced from the wall with a second angular velocity, and the robot cleaner 1 may maintain a significant large angular velocity so as to allow the robot cleaner to be spaced from the wall as soon as possible in state S1040.

As described above, in response to the first contact signal being generated, the robot cleaner 1 may rotate to the second direction spaced from the wall with the first angular velocity, and the robot cleaner 1 may maintain a significant small angular velocity so as to maintain the contact with the wall for the maximum long time in state S1030.

In response to the first and second contact signals not being generated, the robot cleaner 1 may rotate to the first direction approaching the wall to be followed with the fixed angular velocity and approach the wall in state S1020.

As described above, in response to the first contact signal continuously being generated, the robot cleaner 1 may rotate to the second direction spaced from the wall with the first angular velocity, and the robot cleaner 1 may maintain a significant small angular velocity so as to maintain the contact with the wall, for example, for the maximum long time, in state S1030.

In response to the second contact signal being generated, the robot cleaner 1 may rotate to the second direction spaced from the wall with the second angular velocity, and the robot cleaner 1 may maintain a significant large angular velocity so as to allow the robot cleaner to be spaced from the wall, for example, as soon as possible, in state S1040.

As described above, in response to the second contact signal being generated, the robot cleaner 1 may rotate to the second direction spaced from the wall with the second angular velocity, and the robot cleaner 1 may maintain a significant large angular velocity so as to allow the robot cleaner to be spaced from the wall, for example, as soon as possible, in state S1040.

In response to the second contact signal being continuously generated, the robot cleaner 1 may rotate to the second direction spaced from the wall with the second angular velocity, and the robot cleaner 1 may maintain a significant large angular velocity so as to allow the robot cleaner to be spaced from the wall, for example, as soon as possible, in state S1040.

In response to the first and second contact signals no longer being generated, the robot cleaner 1 may rotate to the first direction approaching the wall to be followed and approach the wall in state S1020.

In response to the second contact signal being continuously generated beyond a preset time t_tol, the robot cleaner 1 may perform a backward driving operation in state S1050.

Figure 11:
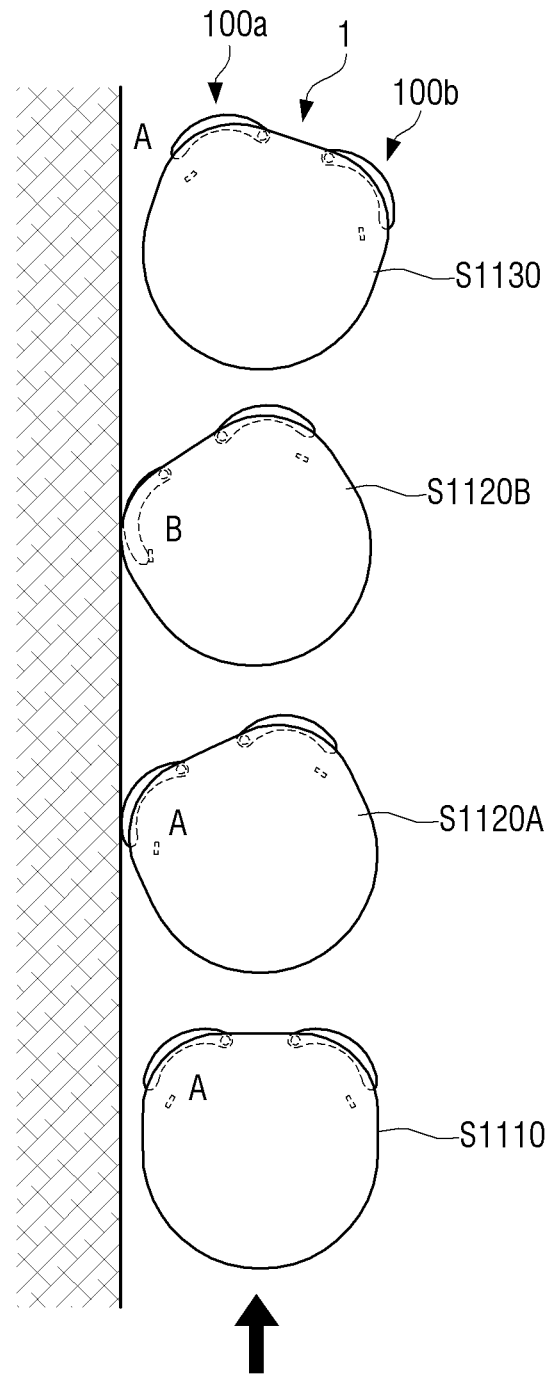
FIG. 11 is a diagram illustrating a wall following process of a robot cleaner according to an exemplary embodiment.
Figure 12:
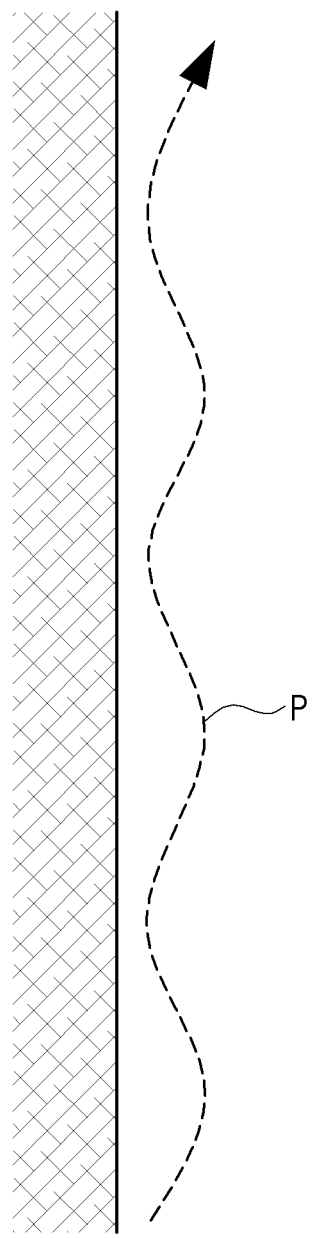
FIG. 12 is a plan view illustrating a trajectory generated in the wall following process of FIG. 11.

FIG. 11 is a plan view illustrating a wall following process of the robot cleaner 1 according to the exemplary embodiment, and FIG. 12 is a diagram illustrating a trajectory P generated in the wall following process of FIG. 11.

Referring to FIG. 11, the robot cleaner 1 may start the wall following mode and drive straight along an arrow. While the robot cleaner 1 drives straight, in response to the first and second contact signals not being generated, the robot cleaner 1 may maintain the straight driving, and the rotation unit 110 may be located in the first position A in state S1110.

While the robot cleaner 1 drives straight, in response to the first and second contact signals not being generated within the preset time t_c, the robot cleaner 1 may rotate to the first direction approaching the wall to be followed with a fixed angular velocity and approach the wall, and the rotation unit 110 may be located in the first position A in state S1120A.

In response to the first contact signal being generated within the preset time while the robot cleaner 1 approaches the wall, the robot cleaner 1 may rotate to the second direction spaced from the wall with the first angular velocity, and the robot cleaner 1 may maintain a significantly small angular velocity so as to maintain the contact with the wall for a period of time, for example, a maximum long time. Then, the robot cleaner 1 may be spaced from the wall, and the rotation unit 110 may be located in the first position A in state S1130.

However, in response to the robot cleaner 1 approaching the wall with a large angular velocity and the like, the second contact signal may be generated even in the rotation operation according to the generation of the first contact signal, and the rotation unit 110 may be located in the second position in state S1120B.

The robot cleaner 1 may rotate to the second direction spaced from the wall with the second angular velocity, and the robot cleaner 1 may maintain a significant large angular velocity so as to allow the robot cleaner to be spaced from the wall, for example, as soon as possible. Then, the robot cleaner may be spaced from the wall in state S1130.

Referring to FIG. 12, as described above, in response to the first contact signal being generated through the contact made with the wall, the robot cleaner 1 may rotate to the second direction spaced from the wall with the first angular velocity, and the robot cleaner 1 may rotate to the first direction with a significant small angular velocity so as to maintain the contact with the wall, for a period of time, for example, a maximum long time.

In response to the first and second contact signals not being generated within a preset time after the robot cleaner 1 rotates with the significant small angular velocity and then is spaced from the wall, the robot cleaner 1 may rotate to the first direction with the fixed angular velocity so as to be in contact with the wall again.

Accordingly, the robot cleaner 1 according to an exemplary embodiment may move while drawing the trajectory P illustrated in FIG. 12.

Through the movement of the robot cleaner 1, even in response to the robot cleaner 1 being located between the maximum short distance and the maximum remote distance to the wall, the robot cleaner 1 may clean the area between the robot cleaner 1 and the wall by the rotation unit 110 capable of protruding from the outer circumference of the robot cleaner 1 and leading into the robot cleaner 1 and the auxiliary brush unit 140 installed in the rotation unit 110.

Accordingly, the robot cleaner 1 may move via most of the area between the wall and the robot cleaner 1, and thus the robot cleaner 1 may clean most of the area between the wall and the robot cleaner 1. The robot cleaner 1 may rotate with an angular velocity for a step according to the first and second contact signals without the backward driving in response to the robot cleaner 1 being in contact with the wall and simultaneously may follow the wall, and thus the robot cleaner 1 may efficiently perform the cleaning.

Figure 13:
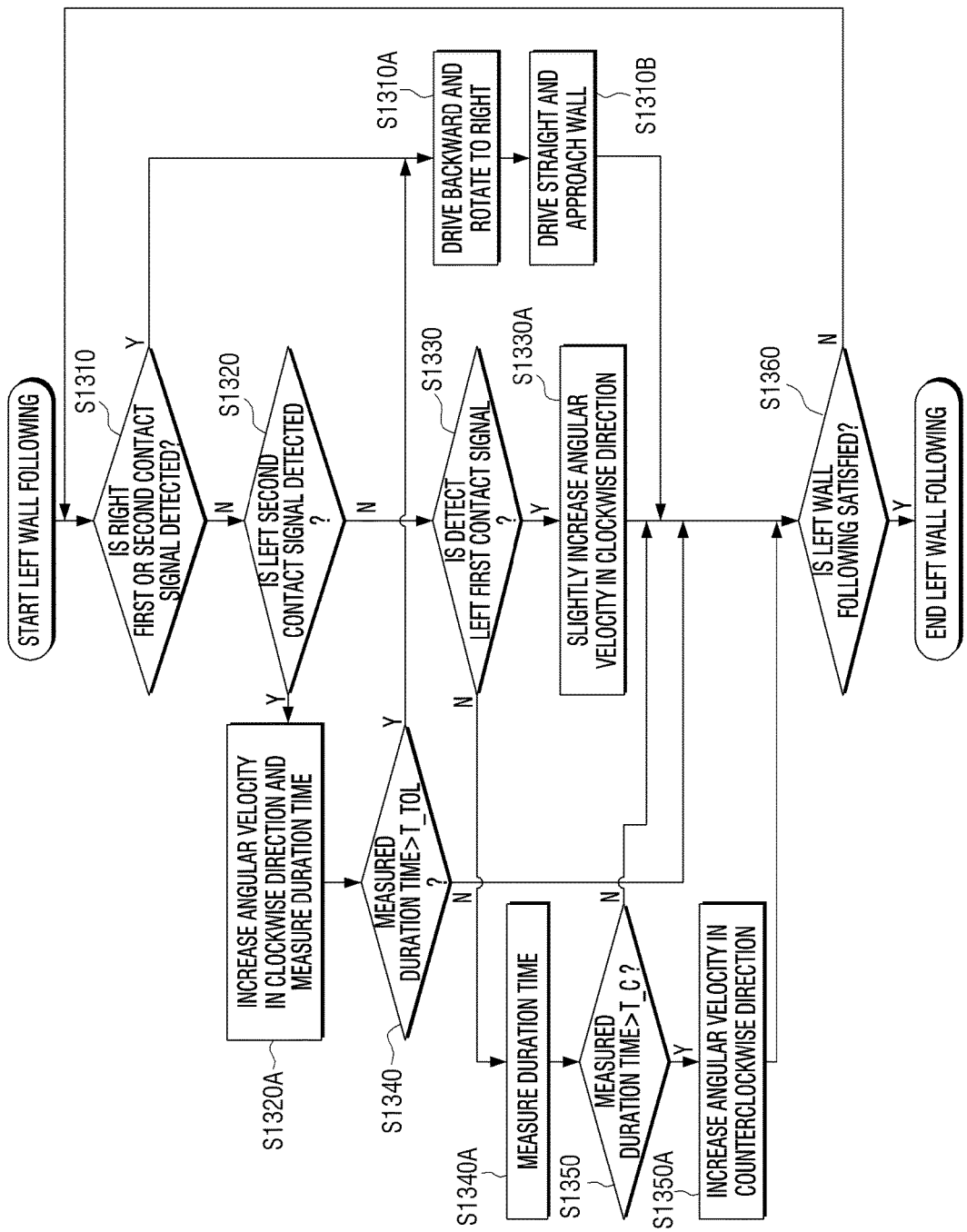
FIG. 13 is a flowchart illustrating a controlling method of a robot cleaner in a left wall following mode according to an exemplary embodiment.
Figure 14:
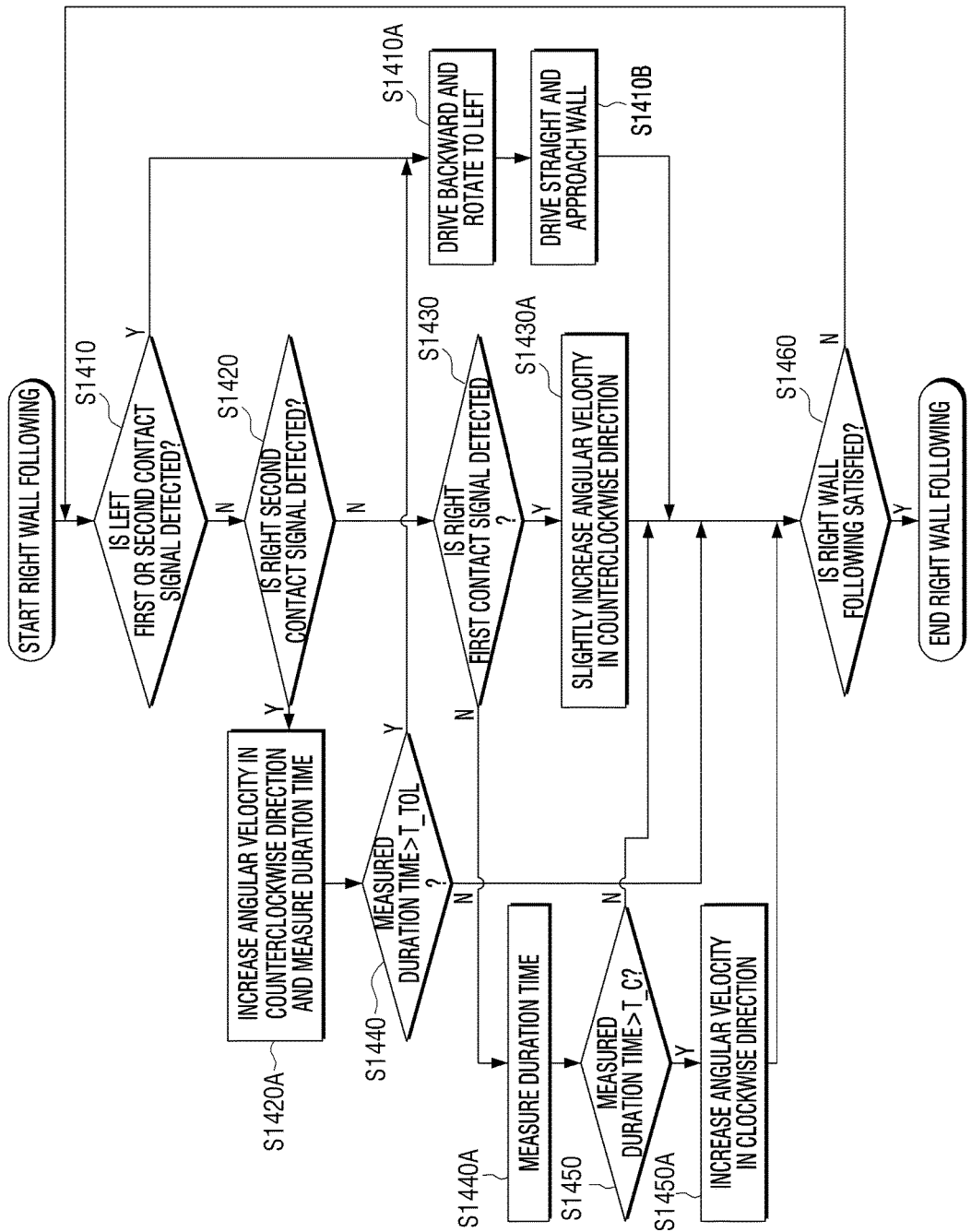
FIG. 14 is a flowchart illustrating a controlling method of a robot cleaner in a right wall following mode according to an exemplary embodiment.

FIG. 13 is a flowchart illustrating a controlling method of the robot cleaner 1 in a left wall following mode, and FIG. 14 is a flowchart illustrating a controlling method of the robot cleaner in a right wall following mode.

The controlling method in the left wall following mode will be described with reference to FIG. 13, and the controlling method in the right wall flowing mode is the same as the controlling method in the left wall following method, and thus the controlling method in the right wall following mode will be omitted.

In the controlling method of the robot cleaner 1 in the left wall following mode, the first direction mentioned as above may be a counterclockwise direction, and the second direction mentioned as above may be a clockwise direction.

First, in response to a wall being detected through the first detector 20, the robot cleaner 1 may start the wall following mode and start left wall following.

The robot cleaner 1 may determine whether or not a right first contact signal or a right second contact signal is generated in step S1310. In response to the first and second contact signals being generated through the second detector 100 located in the right of the robot cleaner 1 in path S1310—Y during the left wall following of the robot cleaner 1, the robot cleaner 1 may drive backward and rotate to the right with a fixed angular velocity in step S1310A.

The robot cleaner 1 may drive straight after the rotation, avoid an obstacle expected to be located in the right based on the first and second contact signals generated in the right, and approach the wall again in step S1310B.

In response to the left wall following being satisfied in path S1360—Y, the robot cleaner 1 may end the left wall following, and in response to the left wall following not being satisfied in path S1360—N, the robot cleaner 1 may start the left wall following again.

In response to the first and second contact signals not being generated through the second detector 100 located in the right of the robot cleaner 1 in path S1310—N, the robot cleaner 1 may determine whether or not the left second contact signal is generated in step S1320.

In response to the left second contact signal being generated in path S1320—Y, the robot cleaner may increase the angular velocity in the clockwise direction regardless of generation of the left first contact signal, and measure a generation duration time of the second contact signal in step S1320A.

In response to the left second contact signal being continuously generated in a state that the measured time is beyond a preset time t_tol in path S1340—Y, the robot cleaner 1 may drive backward and rotate to the right with the fixed angular velocity in step S1310A, and the robot cleaner 1 may drive straight again and approach the wall in step S1310B. Then, in response to the left wall following being satisfied in path S1360—Y, the robot cleaner 1 may end the left wall following, and in response to the left wall following not being satisfied in path S1360—N, the robot cleaner 1 may start the left wall following again.

In response to the measured time not being beyond the preset time t_tol in path S1340—N, the robot cleaner 1 may proceed to step S1360. In response to the left wall following being satisfied in path S1360—Y, the robot cleaner 1 may end the left wall following, and in response to the left wall following not being satisfied in path S1360—N, the robot cleaner 1 may start the left wall following again.

In response to the left second contact signal not being generated in path S1320—N of the left wall following process, the robot cleaner 1 may proceed to step S1330. In response to the left first contact signal being generated in path S1330—Y, the robot cleaner 1 may rotate with an angular velocity slightly increased to the clockwise direction in state S1330A.

Then, in response to the left wall following being satisfied in path S1360—Y, the robot cleaner 1 may end the left wall following, and in response to the left wall following not being satisfied in path S1360—N, the robot cleaner 1 may start the left wall following again.

In response to the left first contact signal not being generated in path S1330—N, the robot cleaner 1 may measure a duration time in which the left first contact signal is not generated in step S1340A.

Then, in response to the measured duration time being beyond a preset time t_c in path S1350—Y, the robot cleaner may rotate with the angular velocity increased to the counterclockwise direction in step S1350A.

Then, in response to the left wall following being satisfied in path S1360—Y, the robot cleaner 1 may end the left wall following, and in response to the left wall following not being satisfied in path S1360—N, the robot cleaner 1 may start the left wall following again.

In response to the measured duration time not being beyond the preset time t_c in path S1350—N, the robot cleaner may proceed to step S1360. In response to the left wall following being satisfied in path S1360—Y, the robot cleaner 1 may end the left wall following, and in response to the left wall following not being satisfied in path S1360—N, the robot cleaner 1 may start the left wall following again.

Accordingly, the robot cleaner 1 may move via most of the area between the wall and the robot cleaner 1, and thus the robot cleaner 1 may clean most of the area between the wall and the robot cleaner 1. The robot cleaner 1 may rotate with an angular velocity for a step according to the first and second contact signals without the backward driving in response to the robot cleaner 1 being in contact with the wall and simultaneously may follow the wall, and thus the robot cleaner 1 may efficiently perform the cleaning.

The exemplary embodiment has described that the robot cleaner 1 may maintain the fixed angular velocity in response to the robot cleaner 1 approaching the wall or the robot cleaner 1 being spaced from the wall, but this is not limited thereto. For example, the first and second angular velocities may be linearly increased according to preset angular accelerations to reach target angular velocities. In another example, the first and second angular velocities may be increased according to angular accelerations linearly increased to reach target angular velocities.

Figure 15:
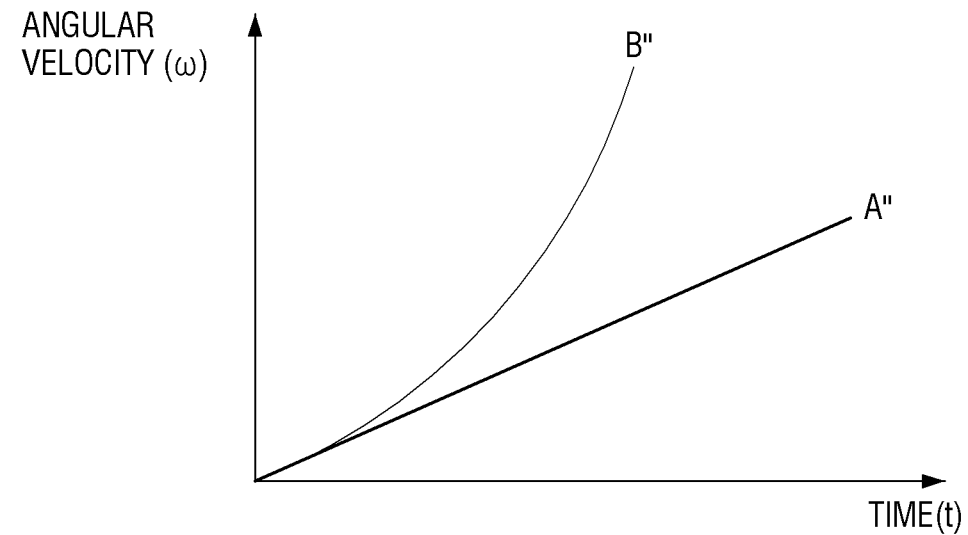
FIG. 15 is a diagram illustrating an increasing process of an angular velocity and an angular acceleration according to an exemplary embodiment.
Figure 15:
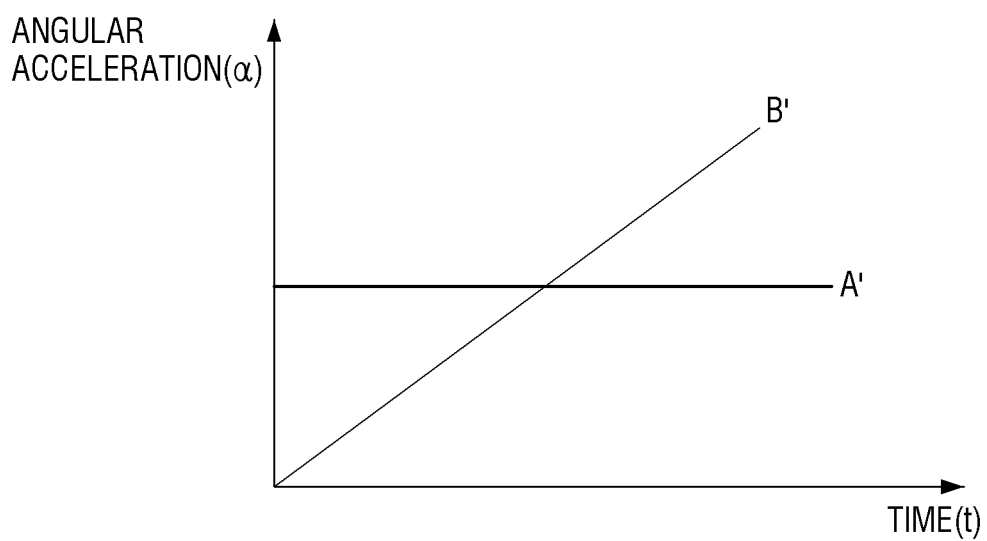

FIG. 15 illustrates a process that an angular velocity $\omega$ and an angular acceleration $\alpha$ are increased in a process that the angular velocity $\omega$ and the angular acceleration $\alpha$ are changed according to a time t.

That is, in response to the angular acceleration being kept to a fixed value along a line A' regardless of the time t, the robot cleaner 1 may be operated according to the angular velocity linearly increased along a line A". In response to the angular acceleration being linearly increased according to the time t along a line B', the robot cleaner 1 may be operated according to the angular velocity increased in a curve form of a quadratic function along a line B".

Figure 16:
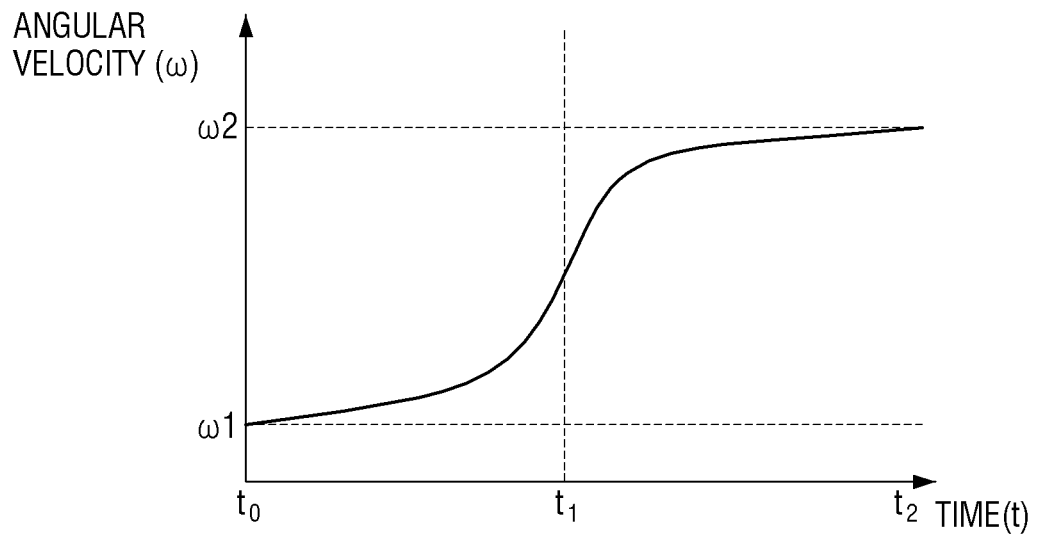
FIG. 16 is a diagram illustrating a changing process of an angular velocity and an angular acceleration from an initial angular velocity to a final angular velocity an exemplary embodiment.
Figure 16:
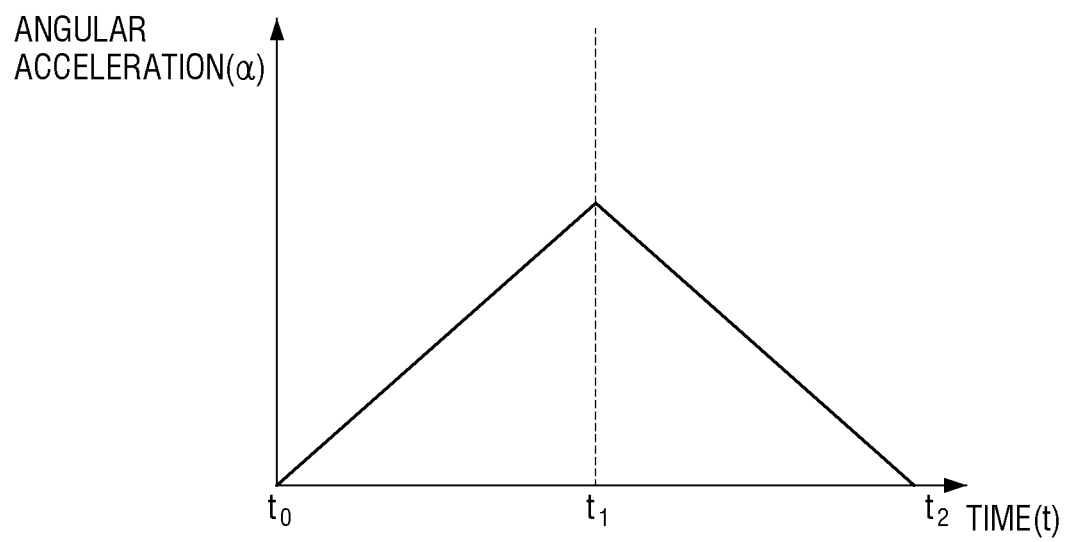

FIG. 16 illustrates a process that an angular velocity $\omega$ and an angular acceleration $\alpha$ are changed from an initial angular velocity $\omega 1$ to a final angular velocity $\omega 2$ to be targeted according to a time t.

That is, in response to being determined that it is necessary to increase the angular velocity to the final angular velocity $\omega 2$ in a state that the robot cleaner 1 rotates with the initial angular velocity $\omega 1$, the robot cleaner 1 may be operated according to the angular velocity increased in a curve form of a quadratic function. The robot cleaner 1 may be gently operated according to the angular velocity increased in a curve form of a quadratic function as compared with the angular velocity linearly increased.

The relationship between the angular velocity $\omega$ and the angular acceleration $\alpha$ will be described in detail with reference to FIG. 16.

The angular acceleration may be linearly increased in a period from $t_0$ to $t_1$, and the angular velocity corresponding to the angular acceleration may be extremely slowly increased from $t_0$ corresponding to the initial angular velocity $\omega 1$. The angular velocity corresponding to the angular acceleration linearly increased may be slowly increased more than the angular velocity corresponding to the fixed angular acceleration. The angular acceleration may be the maximum value at $t_1$ and the angular velocity corresponding to the maximum angular acceleration may be rapidly increased. The angular acceleration may be linearly reduced in a period from $t_1$ to $t_2$. The angular velocity corresponding to the angular acceleration may be still rapidly increased at $t_1$, but the angular velocity may be slowly increased, and may be extremely slowly increased to reach the final angular velocity $\omega 1$ at $t_2$.

The robot cleaner 1 operated according to the angular velocity as described above may slowly perform the operation for increasing the rotation speed and slowly complete the operation. Accordingly, the load of the driver 40 in the robot cleaner 1 may be reduced as compared with the operation according to the angular velocity linearly changed.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A robot cleaner comprising:
a first detector configured to generate a wall detection signal;
a second detector configured to generate a first contact signal through contact with a wall;
a cleaner main body in which the first and second detectors are disposed and which includes a driver configured to drive on a surface to be cleaned; and
a controller which is mounted on the cleaner main body and to which the first and second detectors and the driver are electrically coupled,
wherein the controller controls the driver so that the robot cleaner moving to one direction moves along the wall based on the wall detection signal, the robot cleaner rotates and moves in a first direction towards the wall to be in contact with the wall in response to the first contact signal not being generated within a preset time, and the robot cleaner rotates and moves in a second direction away from the wall to be spaced apart from the wall in response to the first contact signal being generated by the second detector.

2. The robot cleaner as claimed in claim 1, wherein the first detector includes a plurality of distance sensors disposed in a front of the cleaner main body.

3. The robot cleaner as claimed in claim 1, wherein the second detector includes:
a plurality of rotation units, the plurality of rotation units being elastically hinge-coupled to the cleaner main body and disposed to protrude more than an outer circumference of the cleaner main body;
a first sensor configured to generate the first contact signal; and
a second sensor configured to generate a second contact signal by detecting the plurality of rotation units rotated toward an inside of the cleaner main body by a preset angle after the first contact signal is generated.

4. The robot cleaner as claimed in claim 3, wherein the plurality of rotation units rotate from an initial position in which the plurality of rotation units protrude more than the outer circumference of the cleaner main body to a position in which the second contact signal is generated through lead-in of the plurality of rotation units to the inside of the cleaner main body.

5. The robot cleaner as claimed in claim 3, wherein outer surfaces of the plurality of rotation units are curved to be protruded from the cleaner main body.

6. The robot cleaner as claimed in claim 3, wherein the first sensor is disposed in outer surfaces of the plurality of rotation units.

7. The robot cleaner as claimed in claim 6, wherein the first sensor includes at least one tactile sensor.

8. The robot cleaner as claimed in claim 3, wherein the first sensor is disposed in the cleaner main body, and is established in a position closer to the plurality of rotation units than the second sensor.

9. The robot cleaner as claimed in claim 8, wherein the first sensor is a photo sensor.

10. The robot cleaner as claimed in claim 3, wherein the second sensor is a micro switch configured to generate the second contact signal by being pressed by the plurality of rotation units.

11. The robot cleaner as claimed in claim 3, wherein the second sensor is a photo sensor configured to detect the plurality of rotation units which are led into the inside of the cleaner main body.

12. The robot cleaner as claimed in claim 3, wherein an auxiliary brush unit is rotatably coupled to a bottom of each of the plurality of rotation units.

13. A method of controlling a robot cleaner, the method comprising:
- detecting a wall through the robot cleaner moving to one direction;
- moving the robot cleaner along the wall;
- turning on a first sensor provided in the robot cleaner by rotating and moving the robot cleaner in a first direction towards the wall to be in contact with the wall in response to the first sensor not being turned on within a preset time;
- turning off the first sensor by rotating and moving the robot cleaner in a second direction away from the wall with a first angular velocity while the robot cleaner moves; and
- turning on the first sensor by rotating and moving the robot cleaner in the first direction to be in contact with the wall in response to the first sensor not being turned on within the preset time after the first sensor is turned off.

14. A method of controlling a robot cleaner, the method comprising:
- detecting a wall through the robot cleaner moving to one direction;
- moving the robot cleaner along the wall;
- turning on a first sensor provided in the robot cleaner by rotating and moving the robot cleaner in a first direction towards the wall to be in contact with the wall in response to the first sensor not being turned on within a preset time;
- in response to a second sensor provided in the robot cleaner being turned on in a state where the first sensor is not turned off by rotating and moving the robot cleaner in a second direction away from the wall with a first angular velocity while the robot cleaner moves, sequentially turning off the second sensor and the first sensor by rotating the robot cleaner with a second angular velocity greater than the first angular velocity in the second direction; and
- turning on the first sensor by rotating and moving the robot cleaner in the first direction to be in contact with the wall in response to the first sensor not being turned on within the preset time after the first sensor is turned off.

15. The method as claimed in claim 14, further comprising allowing the robot cleaner to drive backward in response to an on state of the second sensor being maintained beyond a preset time after the second sensor is turned on and the first sensor is not turned off.

16. The method as claimed in claim 14, wherein the first angular velocity and the second angular velocity are linearly increased and reduced.

17. The method as claimed in claim 14, wherein the first angular velocity and the second angular velocity are increased and reduced according to angular accelerations linearly increased and reduced.

18. A method of controlling a robot cleaner, the method comprising:
- detecting a wall through the robot cleaner moving to one direction;
- moving the robot cleaner along the wall;
- turning on a first sensor provided in the robot cleaner by rotating and moving the robot cleaner in a first direction towards the wall to be in contact with the wall in response to the first sensor not being turned on within a preset time;
- turning off the first sensor by rotating and moving the robot cleaner in a second direction away from the wall with a first angular velocity while the robot cleaner moves; and
- turning on the first sensor by rotating and moving the robot cleaner in the first direction to be in contact with the wall in response to the first sensor not being turned on within the preset time after the first sensor is turned off,
- the method further comprising rotating the robot cleaner to the one direction after a backward driving of the robot cleaner in response to a third sensor or a fourth sensor disposed in one side of the robot cleaner which is not in contact with the wall and configured to detect contact with an obstacle being turned on between the moving of the robot cleaner and the turning off of the first sensor.

19. The method as claimed in claim 18, further comprising allowing the robot cleaner to approach the wall again by moving the robot cleaner rotated to the one direction forward.

* * * * *